(12) United States Patent
Yamato (10) Patent No.: US 6,754,555 B2
(45) Date of Patent: Jun. 22, 2004

(54) INTERFERENCE PREVENTING APPARATUS (75) Inventor: Kuniharu Yamato, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 77 days.

(21) Appl. No.: 10/253,618

(22) Filed: Sep. 25, 2002

(65) Prior Publication Data
US 2003/0060909 A1 Mar. 27, 2003

(30) Foreign Application Priority Data
Sep. 27, 2001 (JP) ........................................ 2001-296771

(51) Int. Cl.[7] .......................... G06F 19/00; G05B 19/18
(52) U.S. Cl. ..................................... 700/178; 700/255
(58) Field of Search ................................ 700/177, 178, 700/255

(56) References Cited

U.S. PATENT DOCUMENTS

| | | | | |
|---|---|---|---|---|
| 4,758,961 A | * | 7/1988 | Uemura et al. | 700/160 |
| 5,339,015 A | * | 8/1994 | Hanaki et al. | 318/600 |
| 6,415,604 B1 | * | 7/2002 | Motomura et al. | 60/399 |
| 6,473,672 B1 | * | 10/2002 | Holdgreve | 700/178 |
| 6,508,325 B1 | * | 1/2003 | Schwarz et al. | 180/167 |

OTHER PUBLICATIONS

Patent Abstracts of Japan Publication No. 10–091223 dated Apr. 10, 1998.
Patent Abstracts of Japan Publication No. 10–094945 dated Apr. 14, 1998.

* cited by examiner

*Primary Examiner*—Leo Picard
*Assistant Examiner*—Elliot L Frank
(74) *Attorney, Agent, or Firm*—Westerman, Hattori, Daniels & Adrian, LLP (57) ABSTRACT

The present invention provides an interference preventing apparatus which performs an interference checking operation for plural interfering relationships between a movable member and a structural member. The interference preventing apparatus (1) comprises: an interference area defining section (51) for defining an interference area where the movable member is likely to interfere with the structural member; an interference area data storage section (52) for storing therein data of the defined interference area; and an interference checking section (2) which performs the interference checking operation for any of the interfering relationships on the basis of the interference area data and target movement position data of the movable member and, if a possibility of the interference is confirmed, outputs an interference confirming signal to the numerical controller. The interference checking section (2) performs the interference checking operation only for an interfering relationship selected out of the plural interfering relationships by an external input.

3 Claims, 8 Drawing Sheets

PRIOR ART

INTERFERENCE PREVENTING APPARATUS

BACKGROUND OF THE INVENTION

1. Field of the Invention

The present invention relates to an interference preventing apparatus and, more specifically, to an apparatus for preventing a movable member and a structural member of an NC machine tool from interfering with each other in any of plural interfering relationships.

2. Description of Related Art

Figure 8:
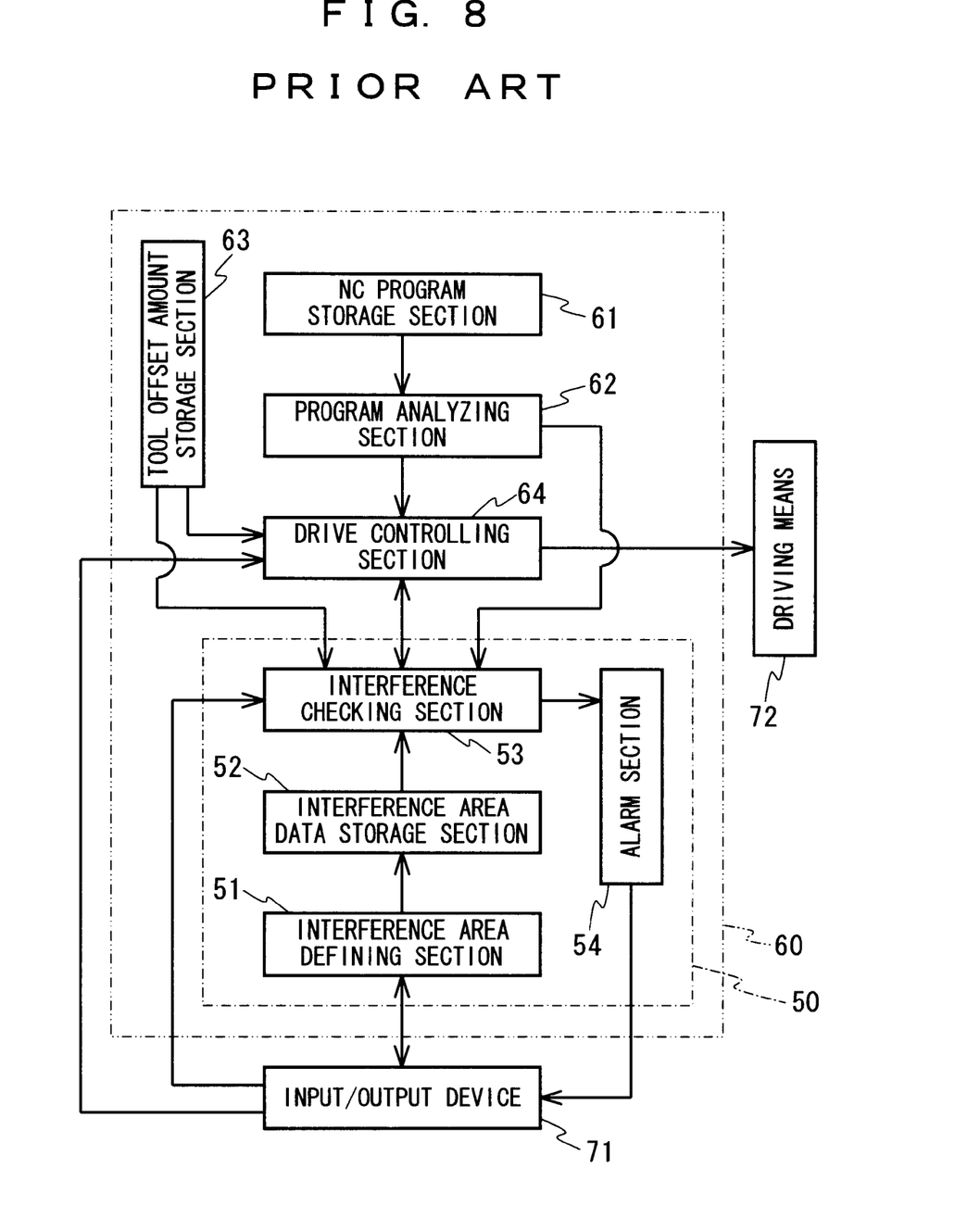
FIG. 8 is a block diagram illustrating the schematic construction of a conventional interference preventing apparatus.

An interference preventing apparatus as shown in FIG. 8 is conventionally known as the interference preventing apparatus of the aforesaid type. As shown in FIG. 8, the interference preventing apparatus 50 is accommodated in a numerical controller 60 of an NC machine tool, and includes an interference area defining section 51, an interference area data storage section 52, an interference checking section 53 and an alarm section 54.

In the following description, it is assumed that an NC lathe is employed which includes a tool post for holding a tool, a headstock for rotatably supporting a spindle, and a tailstock disposed in opposed relation to the headstock for rotatably supporting a tailstock spindle, and the interference preventing apparatus 50 is adapted to prevent interference between the tool and a spindle portion (including the spindle and a chuck attached to the spindle) and interference between the tool and a tailstock portion (including the tailstock and the tailstock spindle) in the NC lathe.

The numerical controller 60 further includes an NC program storage section 61, a program analyzing section 62, a tool offset amount storage section 63 and a drive controlling section 64. The interference area defining section 51, the interference checking section 53, the alarm section 54 and the drive controlling section 64 are connected to an input/output device 71 including an operating panel and a CRT. The drive controlling section 64 is connected to driving means 72 including a servo motor and a spindle motor for moving the tool post.

The NC program storage section 61 stores therein preliminarily generated NC programs. The tool offset amount storage section 63 stores therein a tool offset amount for each tool held by the tool post.

The program analyzing section 62 sequentially analyzes the NC programs stored in the NC program storage section 61, extracts a command related to a movement position of the tool post, and outputs the extracted command to the drive controlling section 64.

The drive controlling section 64 controls the movement of the tool post and the rotation of the spindle. For the movement of the tool post, for example, the drive controlling section 64 generates target movement position data for the tool post on the basis of the command signal outputted from the program analyzing section 62 and the tool offset amount of the tool stored in the tool offset amount storage section 63, and then properly processes the target movement position data for generation of a control signal, which is in turn outputted to the driving means 72 for controlling the driving means 72.

Where a pulse handle provided on the operation panel of the input/output device 71 is operated for manual operation, for example, a pulse signal is outputted to the drive controlling section 64 from the pulse handle. Then, the drive controlling section 64 generates target movement position data on the basis of the number of pulses of the received pulse signal, and properly processes the target movement position data for generation of a control signal, which is in turn outputted to the driving means 72 for controlling the driving means 72.

The tool post target movement position data generated by the drive controlling section 64 is outputted to the interference checking section 53.

The interference area defining section 51 defines interference areas where the tool is likely to interfere with the spindle portion and the tailstock portion within a area where the tool held by the tool post is movable. For example, the interference areas are interactively defined by means of the input/output device 71, and data indicative of the interference areas is stored in the interference area data storage section 52. The interference areas are represented by position coordinate data which defines the contours of the spindle portion and the tailstock portion in a machine coordinate system, and areas within the contours are regarded as the interference areas.

The interference checking section 53 checks for a possibility of the interference between the tool and the spindle portion and a possibility of the interference between the tool and the tailstock portion upon reception of a process implementation signal from the program analyzing section 62 in an automatic operation or upon reception of a process implementation signal from the input/output device 71 in the manual operation.

More specifically, the interference area data is read out of the interference area data storage section 52, and a tool offset amount of a tool indexed in a machining position is read out of the tool offset amount storage section 63. Then, movement target positions of an edge of the tool in the machine coordinate system are sequentially calculated on the basis of the tool offset amount thus read out and the tool post target movement position data outputted from the drive controlling section 64. The movement target position data thus calculated is compared with the interference area data for determining whether or not the movement target positions are located within the interference areas. If any of the movement target positions is located within the interference areas, the possibility of the interference is confirmed.

Where the possibility of the interference between the tool and the spindle portion or the tailstock portion is confirmed, the interference checking section 53 outputs a drive stopping signal (interference confirming signal) to the drive controlling section 64, and outputs an alarm display signal (interference confirming signal) to the alarm section 54.

The alarm section 54 displays an alarm on the CRT of the input/output device 71 upon reception of the alarm display signal from the interference checking section 53.

In the interference preventing apparatus 50 having the aforesaid construction, the interference checking section 53 determines whether or not the tool has a possibility to interfere with the spindle portion and the tailstock portion in the automatic operation or in the manual operation. If the possibility of the interference is confirmed, the drive stopping signal is outputted to the drive controlling section 64 from the interference checking section 53 for stopping the movement of the tool post. Thus, the interference between the tool and the spindle portion and the interference between the tool and the tailstock portion are prevented. Further, the alarm display signal is outputted to the alarm section 54 from the interference checking section 53, and the alarm is displayed on the CRT.

However, the conventional interference preventing apparatus 50 described above is given an option to perform or not to perform the interference checking operation for all of the interference areas at a time. In other words, the interference preventing apparatus 50 is not given an option to perform or not to perform the interference checking operation for each of the interference areas and, therefore, suffers from the following drawbacks.

After exchange of the tool attached to the tool post, for example, the tool offset amount should be reset for a tool newly attached to the tool post. A tool offset amount setting operation is performed by employing a presetter or by actually machining a workpiece. In either case, the tool post should be moved toward the spindle for the setting of the tool offset amount.

If the interference checking section 53 is permitted to perform the interference checking operation when the tool offset amount setting operation is performed, the interference checking section 53 calculates the target movement positions of the edge of the tool on the basis of the tool offset amount set before the tool exchange. Therefore, the possibility of the interference is erroneously confirmed even if there is actually no possibility of the interference between the tool and the spindle portion. Thus, the tool offset amount setting operation cannot smoothly be performed.

On the other hand, if the interference checking section 53 is prohibited from performing the interference checking operation when the tool offset amount setting operation is performed, an operator moves the tool while paying careful attention to the interference between the tool and the spindle portion. However, the operator tends to be careless about the interference between the tool and the tailstock portion on the opposite side, so that the tool may collide against the tailstock portion. Therefore, the interference preventing apparatus 50 fails to serve for the intended purpose. Thus, the conventional interference preventing apparatus 50 suffers from poor operability.

In view of the foregoing, it is an object of the present invention to provide an interference preventing apparatus which features an improved operability.

SUMMARY OF THE INVENTION

In accordance with the present invention to achieve the aforesaid object, there is provided an interference preventing apparatus for use in an NC machine tool comprising at least one movable member, a numerical controller for controlling an operation of the movable member, and at least one structural member which is likely to interfere with the movable member, the at least one movable member and the at least one structural member having plural interfering relationships with respect to each other. The interference preventing apparatus is adapted to prevent interference between the movable member and the structural member, and comprises: an interference area defining section for defining an interference area where the movable member is likely to interfere with the structural member within a area where the movable member is movable; an interference area data storage section for storing therein data indicative of the interference area defined by the interference area defining section; and an interference checking section which performs an interference checking operation to check for a possibility of the interference between the movable member and the structural member in any of the plural interfering relationships on the basis of the interference area data stored in the interference area data storage section and data indicative of a target movement position of the movable member controlled by the numerical controller and, if the possibility of the interference is confirmed, outputs an interference confirming signal to the numerical controller; wherein the interference checking section receives a selection signal externally inputted to select at least one of the plural interfering relationships between the at least one movable member and the at least one structural member, and performs the interference checking operation only for the selected interfering relationship.

According to the present invention, the interference area defining section defines the interference area where the movable member is likely to interfere with the structural member within the area where the movable member is movable, and the data indicative of the defined interference area is stored in the interference area data storage section.

Then, the interference checking section checks for the possibility of the interference between the movable member and the structural member in any of the interfering relationships on the basis of the interference area data stored in the interference area data storage section and the data indicative of the target movement position of the movable member controlled by the numerical controller. If the possibility of the interference is confirmed, the interference confirming signal is outputted to the numerical controller. Upon reception of the interference confirming signal, the numerical controller stops the driving and controlling of the movable member.

When the interference checking section receives the selection signal externally inputted to select at least one of the plural interfering relationships between the at least one movable member and the at least one structural member, the interference checking section performs the interference checking operation only for the selected interfering relationship.

Where there are plural interfering relationships between the at least one movable member and the at least one structural member, an interfering relationship to be subjected to the interference checking operation can be selected by the external input in the interference preventing apparatus. Therefore, when the aforesaid tool offset amount setting operation is performed, for example, a particular interfering relationship not to be subjected to the interference checking operation (in the aforesaid case, the interfering relationship between the tool and the spindle portion) can be excluded, so that the interference checking operation is not performed for this particular interfering relationship. Thus, the tool offset amount setting operation can smoothly be performed, while the interference checking operation is kept performed for the other interfering relationships (in the aforesaid case, the interfering relationship between the tool and the tailstock portion). Accordingly, the collision of the tool against the tailstock portion due to an operation mistake can assuredly be prevented, so that the tool offset amount setting operation can safely be performed.

The plural interfering relationships between the at least one movable member and the at least one structural member herein include interfering relationships between one movable member and two or more structural members, interfering relationships between two or more movable members and one structural member, and interfering relationships between two or more movable members and two or more structural members. For each of the interfering relationships, there is an option to perform or not to perform the interference checking operation.

Alternatively, the interference checking section may be adapted to receive a specific operation signal from the numerical controller when the NC machine tool is in a manual operation and, upon reception of the operation signal, be prohibited from performing the interference checking operation for an interfering relationship associated with the received operation signal.

In this interference preventing apparatus, when the interference checking section receives the specific operation signal from the numerical controller in the manual operation of the NC machine tool, the interference checking section is automatically prohibited from performing the interference checking operation for the interfering relationship associated with the received operation signal.

Where the interfering relationship to be subjected to the interference checking operation is selected from the plural interfering relationships by the external input, an operator's input mistake cannot perfectly be eliminated. Therefore, there is a possibility that the interference checking operation is not performed for the intended interfering relationship due to the input mistake.

In the interference preventing apparatus having the aforesaid construction, the interfering relationship not to be subjected to the interference checking operation is automatically determined on the basis of the operation signal for operating the NC machine tool. Therefore, an inconvenience resulting from a human mistake can be eliminated, so that the operation can safely be performed.

In the present invention, the specific operation signal includes a preseter mount signal which is inputted to the numerical controller when a preseter is mounted in the NC machine tool for manually performing the tool offset amount setting operation with the use of the preseter.

DESCRIPTION OF THE PREFERRED EMBODIMENTS

Figure 1:
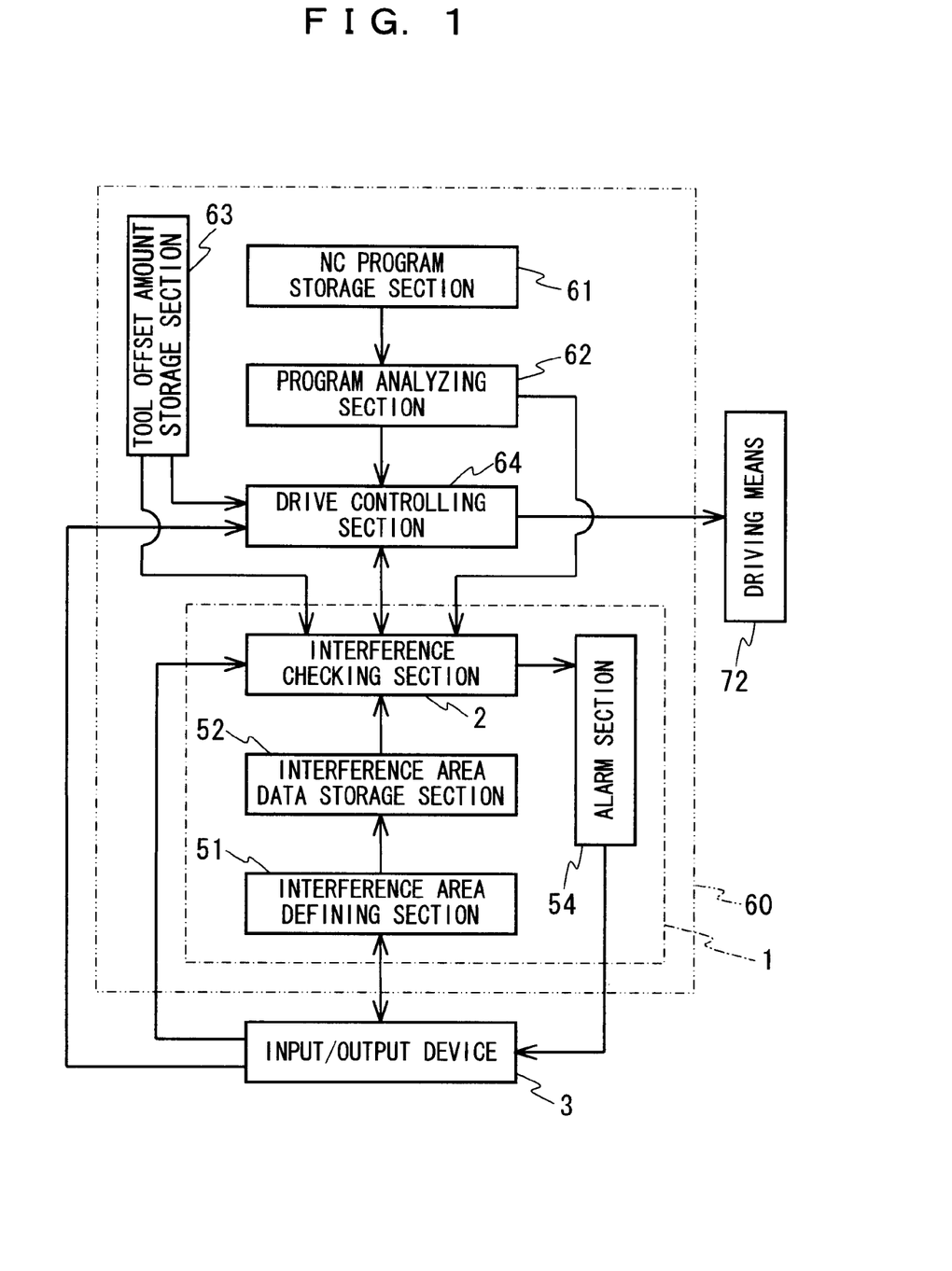
FIG. 1 is a block diagram illustrating the schematic construction of an interference preventing apparatus according to a first embodiment of the present invention.
Figure 2:
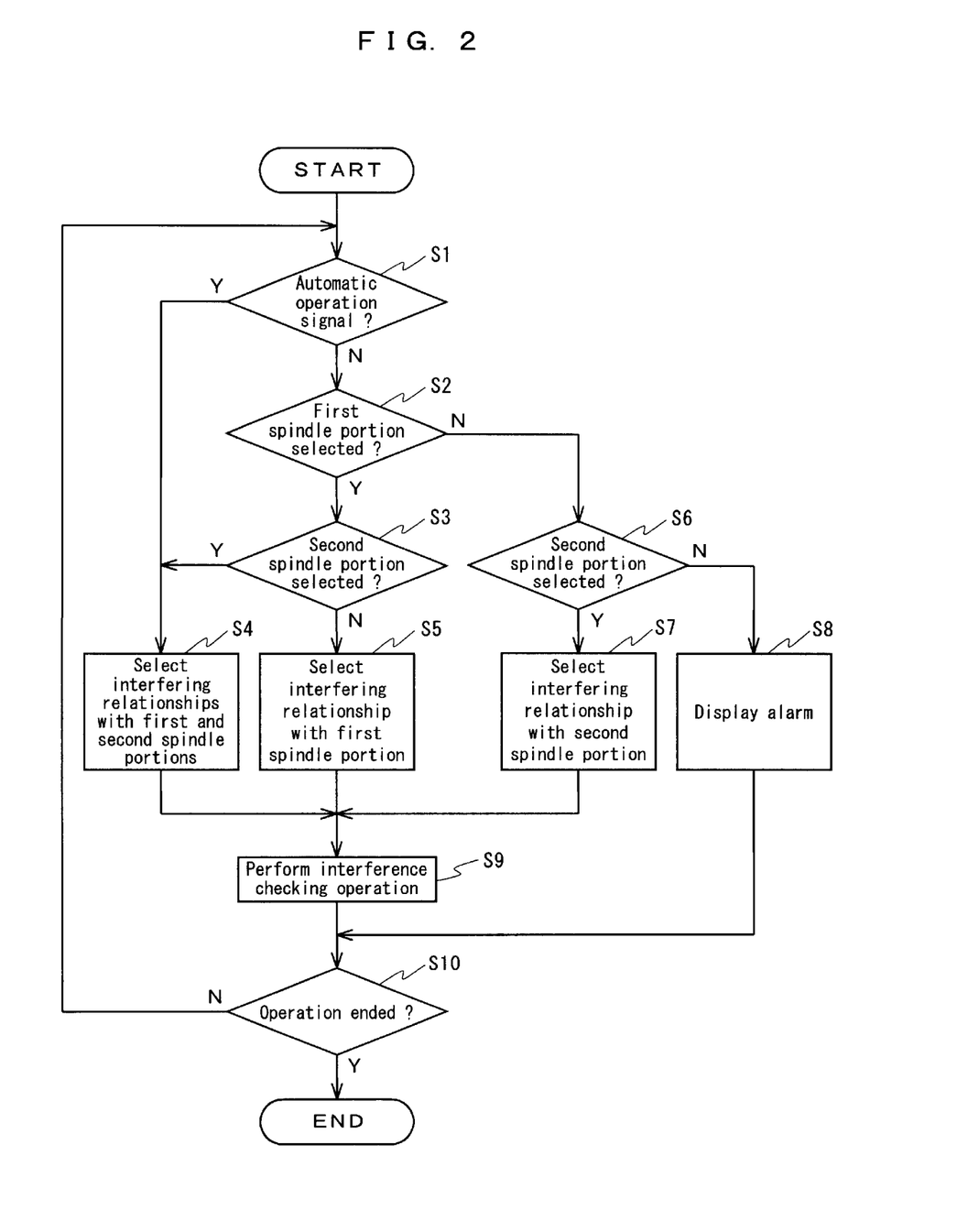
FIG. 2 is a flow chart illustrating a process to be performed by the interference preventing apparatus according to the first embodiment.
Figure 3:
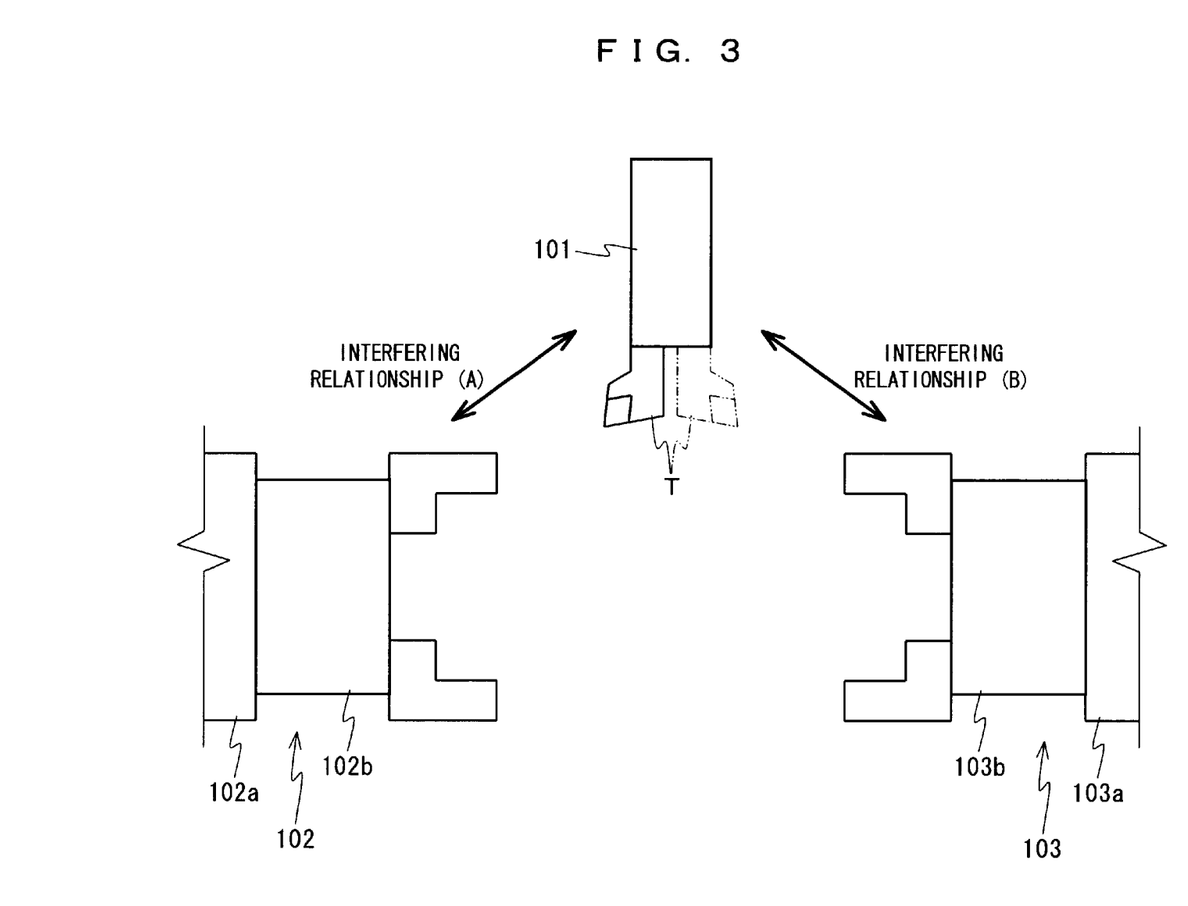
FIG. 3 is a diagram for explaining interfering relationships between a movable member and structural members according to the first embodiment.

With reference to FIGS. 1 to 3, the present invention will hereinafter be described by way of specific embodiments thereof. FIG. 1 is a block diagram illustrating the schematic construction of an interference preventing apparatus according to a first embodiment of the present invention. As shown in FIG. 1, the interference preventing apparatus 1 according to this embodiment is improved over the conventional interference preventing apparatus 50, and the function of an interference checking section 2 differs from that of the conventional interference checking section 53. Further, the function of an input/output device 3 slightly differs from that of the conventional input/output device 71. Components having the same constructions as those of the conventional interference preventing apparatus 50 and the numerical controller 60 are denoted by the same reference numerals, and a detailed explanation will not be given thereto.

In this embodiment, an explanation will be given to a case where an NC machine tool is employed which includes a tool post 101 as a movable member and two spindle portions (first and second spindle portions 102, 103) as structural members which are likely to interfere with the tool post 101. The first spindle portion 102 includes a first spindle 102a and a chuck 102b attached to the first spindle 102a, and the second spindle portion 103 includes a second spindle 103a and a chuck 103b attached to the second spindle 103a. A tool T attached to the tool post 101 has an interfering relationship (A) with respect to the first spindle portion 102, and an interfering relationship (B) with respect to the second spindle portion 103.

In the interference preventing apparatus 1 according to this embodiment, the function of the interference checking section 2 differs from that of the conventional interference checking section 53 as described above. This is a only difference between the interference preventing apparatus 1 and the conventional interference preventing apparatus 50. Further, the function of the input/output device 3 slightly differs from that of the conventional input/output device 71.

More specifically, the input/output device 3 has a function of inputting an interfering relationship to be subjected to an interference checking operation selectively from the interfering relationships (A) and (B) in addition to the function of the conventional input/output device 71. That is, there are three options: (1) the interference checking operation is performed for both the interfering relationship (A) (between the tool T and the first spindle portion 102) and the interfering relationship (B) (between the tool T and the second spindle portion 103); (2) the interference checking operation is performed only for the interfering relationship (A); and (3) the interference checking operation is performed only for the interfering relationship (B). One of these three options is selected. Then, an inputted selection signal is outputted to the interference checking section 2.

The interference checking section 2 performs a process as shown in FIG. 2. Upon reception of an interference checking signal from the program analyzing section 62 or the input/output device 3, the interference checking section 2 starts the process, and judges on the basis of the signal received from the program analyzing section 62 whether or not the NC machine tool is in the automatic operation (Step S1).

If it is judged that the NC machine tool is in the manual operation, the interference checking section 2 performs a process sequence from Step S2 to Step S8. The interference checking section 2 checks the selection signal inputted from the input/output device 3 to determine an interfering relationship to be subjected to the interference checking operation. More specifically, it is first checked in Step S2 whether the first spindle portion 102 is selected. If the first spindle portion 102 is selected, it is checked in Step S3 whether the second spindle portion 103 is selected. If the second spindle portion 103 is selected, the interfering relationships between the tool T and the first spindle portion 102 and between the tool T and the second spindle portion 103 are selected for the interference checking operation (Step S4). On the other hand, if it is judged in Step S3 that the second spindle portion 103 is not selected, only the interfering relationship between the tool T and the first spindle portion 102 is selected for the interference checking operation (Step S5).

If it is confirmed in Step S2 that the first spindle portion 102 is not selected, it is judged in Step S6 whether the second spindle portion 103 is selected. If the second spindle portion 103 is selected, only the interfering relationship between the tool T and the second spindle portion 103 is selected for the interference checking operation (Step S7). If it is confirmed that the second spindle portion 103 is not selected, an alarm signal is outputted to the alarm section 54, and then the process goes to Step S10. This is because an event where the selection signal is not inputted after the interference checking signal is inputted from the input/output device 3 is regarded as an error.

On the other hand, if it is judged in Step S1 that the NC machine tool is in the automatic operation, the process goes to Step S4, and the interfering relationships between the tool T and the first spindle portion 102 and between the tool T and the second spindle portion 103 are selected for the interference checking operation.

After the interfering relationship to be subjected to the interference checking operation is selected in the aforesaid manner, the interference checking section 2 performs the interference checking operation for the selected interfering relationship (Step S9). More specifically, the interference checking section 2 reads interference area data related to the selected interfering relationship out of the interference area data stored in the interference area data storage section 52, and reads a tool offset amount of a tool T indexed in a machining position from the tool offset amount storage section 63. Then, the interference checking section 2 calculates a movement target position of the tool T in the machine coordinate system on the basis of the tool offset amount thus read out and target movement position data of the tool post 101 outputted from the drive controlling section 64, and compares the calculated movement target position data with the read interference area data. Thus, the interference checking section 2 checks whether the movement target position is located within the interference area. If the movement target position is located within the interference area, the interference checking section 2 judges that there is a possibility of the interference.

If the possibility of the interference between the tool T and the first or second spindle portion 102, 103 is confirmed, the interference checking section 2 outputs a drive stopping signal (interference confirming signal) to the drive controlling section 64, and outputs an alarm display signal (interference confirming signal) to the alarm section 54.

Thereafter, the aforesaid process sequence is performed at predetermined sampling intervals and, upon reception of an interference checking end signal from the program analyzing section 62 or the input/output device 3, the interference checking section 2 ends the process (Step S10).

As detailed above, where there are plural interfering relationships (e.g., the interfering relationships between the tool T and the first spindle portion 102 and between the tool T and the second spindle portion 103), the interference preventing apparatus 1 according to this embodiment can select an interfering relationship to be subjected to the interference checking operation. When a tool offset amount setting operation as described above is performed, for example, only an interfering relationship which does not require the interference checking operation (the interfering relationship between the tool T and the first spindle portion 102 if the tool is used for machining on the side of the first spindle portion 102) can be excluded from the interference checking operation. Therefore, the tool offset amount setting operation can smoothly be performed. On the other hand, the interference checking operation is kept performed for an interfering relationship which requires the interference checking operation (the interfering relationship between the tool T and the second spindle portion 103). Therefore, the collision of the tool T against the second spindle portion 103 due to an operation mistake can assuredly be prevented, so that the tool offset amount setting operation can safely be performed.

Figure 4:
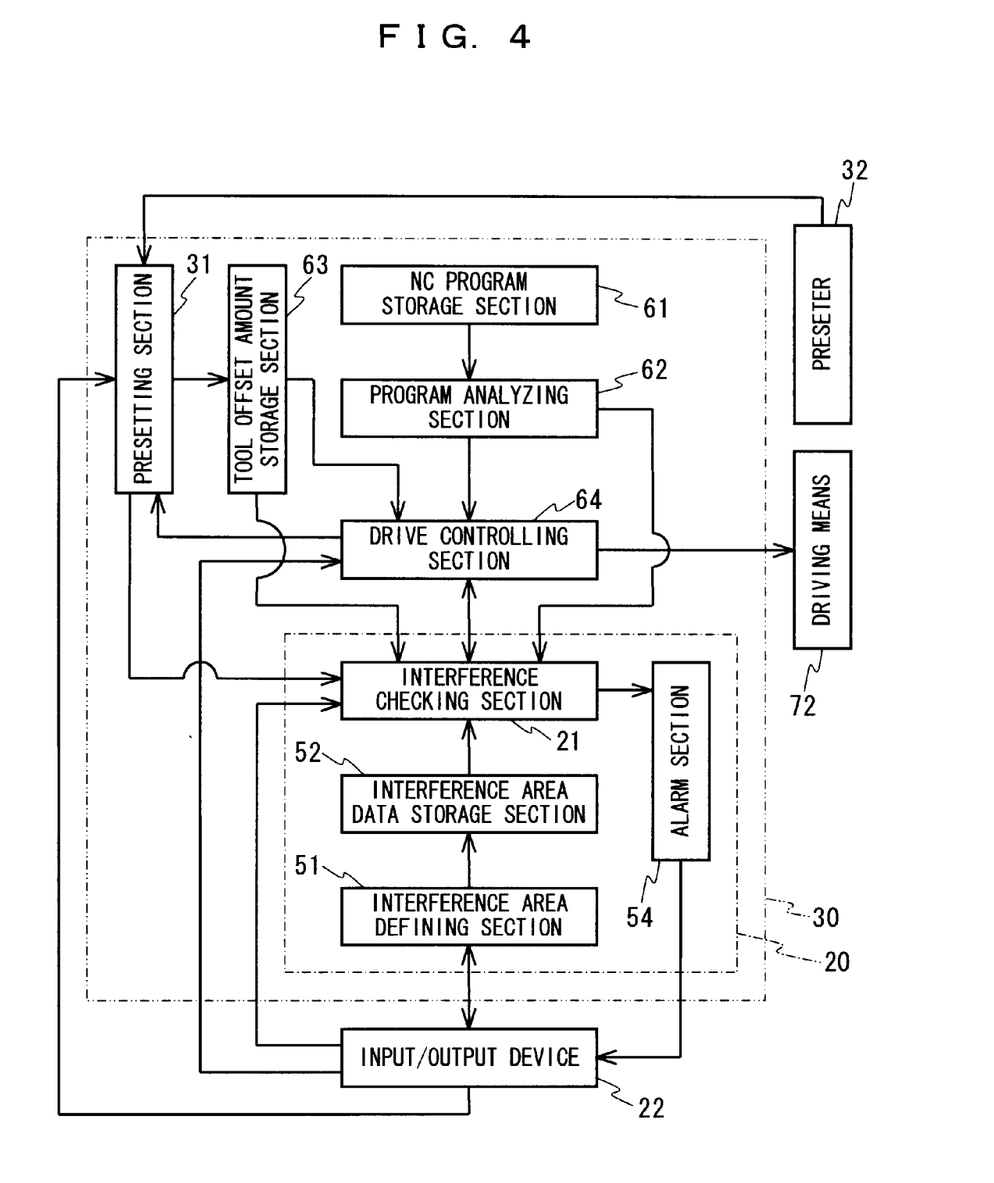
FIG. 4 is a block diagram illustrating the schematic construction of an interference preventing apparatus according to a second embodiment of the present invention.

Next, a second embodiment of the present invention will be described with reference to FIGS. 4 and 5. FIG. 4 is a block diagram illustrating the schematic construction of an interference preventing apparatus according to this embodiment. As shown in FIG. 4, the interference preventing apparatus 20 according to this embodiment is improved over the conventional interference preventing apparatus 50 as in the first embodiment, and the function of an interference checking section 21 differs from that of the conventional interference checking section 53. Further, the functions of an input/output device 22 and a numerical controller 30 slightly differ from those of the conventional input/output device 71 and the numerical controller 60. Components having the same constructions as those of the conventional interference preventing apparatus 50 and the numerical controller 60 are denoted by the same reference numerals, and a detailed explanation will not be given thereto.

As in the first embodiment, the interference preventing apparatus 20 according to this embodiment is adapted to prevent the interference between the tool T and the first spindle portion 102 (interfering relationship (A)) and the interference between the tool T and the second spindle portion 103 (interfering relationship (B)) in the NC machine tool shown in FIG. 3.

In the interference preventing apparatus 20 according to this embodiment, the function of an interference checking section 21 differs from that of the conventional interference checking section 53 as described above. This is a only difference between the interference preventing apparatus 20 and the conventional interference preventing apparatus 50. Further, the functions of the input/output device 22 and the numerical controller 30 slightly differ from those of the conventional input/output device 71 and the numerical controller 60. In addition, a preseter 32 can be mounted in the NC machine tool.

More specifically, the numerical controller 30 includes a presetting section 31 in addition to the NC program storage section 61, the program analyzing section 62, the drive controlling section 64 and the tool offset amount storage section 63. The presetting section 31 calculates a tool offset amount of a tool located in a machining position on the basis of a signal outputted from the preseter 32 mounted in the NC machine tool and current position data (machine coordinates) of the tool post 101 inputted from the drive controlling section 64, and stores the calculated tool offset amount in the tool offset amount storage section 63.

The preseter 32 detects an edge of the tool T when the edge of the tool T touches the preseter 32, and outputs a detection signal to the presetting section 31. Where a tool offset amount of a tool to be used for machining on the side of the first spindle portion 102 is calculated, the preseter 32 is mounted in the vicinity of the first spindle portion 102. Where a tool offset amount of a tool to be used for machining on the side of the second spindle portion 103 is calculated, the presetter 32 is mounted in the vicinity of the second spindle potion 103. When the presetter 32 is mounted in the vicinity of the first spindle portion 102 or the second spindle portion 103 in this manner, a mount signal is outputted to the presetting section 31 and then outputted from the presetting section 31 to the interference checking section 21.

The input/output device 22 has a function of outputting a start signal to the presetting section 31 for starting a tool offset amount calculating operation (presetting operation) in addition to the function of the conventional input/output device 71. The presetting section 31 performs the tool offset amount calculating operation upon reception of the start signal from the input/output device 22.

Figure 5:
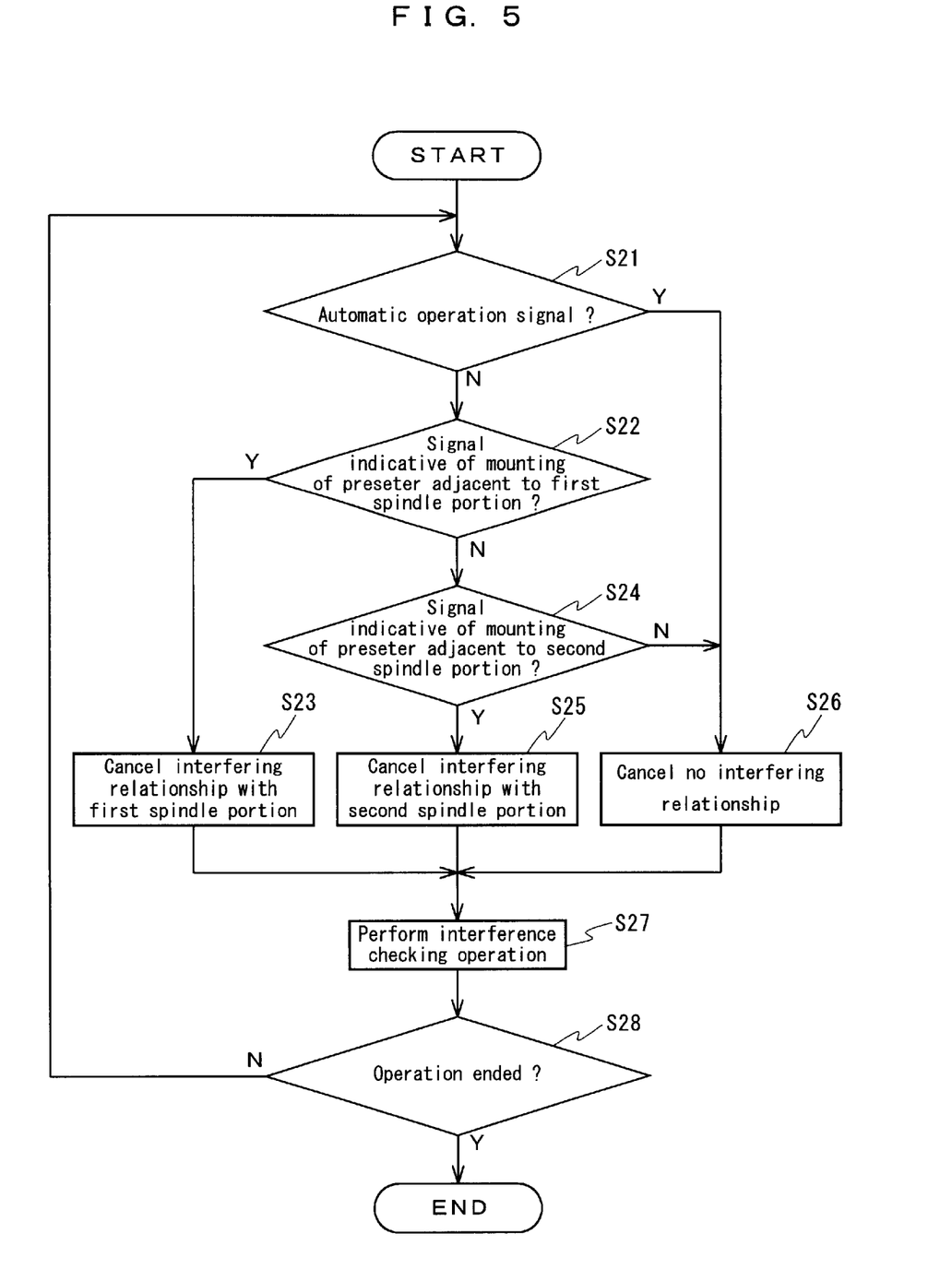
FIG. 5 is a flow chart illustrating a process to be performed by the interference preventing apparatus according to the second embodiment.

The interference checking section 21 performs a process as shown in FIG. 5. Upon reception of an interference checking signal from the program analyzing section 62 or the input/output device 22, the interference checking section 21 starts the process, and judges on the basis of the signal received from the program analyzing section 62 whether or not the NC machine tool is in the automatic operation (Step S21).

If it is judged that the NC machine tool is in the manual operation, the interference checking section 21 performs a process sequence from Step S22 to Step S25. The interference checking section 21 checks the mount signal inputted from the presetting section 31 to determine an interfering relationship not to be subjected to the interference checking operation (or to be excluded from the interference checking operation). More specifically, it is first checked in Step S22 whether the presetter 32 is mounted on the side of the first spindle portion 102. If it is confirmed that the presetter 32 is mounted on the side of the first spindle portion 102, the interference checking operation for the interfering relationship between the first spindle portion 102 and the tool T is cancelled in Step S23. If it is confirmed that the presetter 32 is not mounted on the side of the first spindle portion 102, it is checked in Step S24 whether the presetter 32 is mounted on the side of the second spindle portion 103. If it is confirmed that the presetter 32 is mounted on the side of the second spindle portion 103, the interference checking operation for the interfering relationship between the second spindle portion 103 and the tool T is cancelled in Step S25.

On the other hand, if it is confirmed in Step S24 that the presetter 32 is not mounted on the side of the second spindle portion 103, or if it is judged in Step S21 that the NC machine tool is in the automatic operation, the interference checking operation is cancelled neither for the interfering relationship between the tool T and the first spindle portion 102 nor for the interfering relationship between the tool T and the second spindle portion 103, that is, the interference checking operation is performed for the respective interfering relationships (Step S26).

After the interfering relationship to be excluded from the interference checking operation is determined in the aforesaid manner, the interference checking section 21 performs the interference checking operation for an interfering relationship other than the excluded interfering relationship (Step S27). More specifically, the interference checking section 21 reads interference area data related to the interfering relationship other than the excluded interfering relationship out of the interference area data stored in the interference area data storage section 52, and reads a tool offset amount of a tool T indexed in the machining position from the tool offset amount storage section 63. Then, the interference checking section 21 calculates a movement target position of the tool T in the machine coordinate system on the basis of the tool offset amount thus read out and target movement position data of the tool post 101 outputted from the drive controlling section 64, and compares the calculated movement target position data with the read interference area data. Thus, the interference checking section 21 checks whether the movement target position is located within the interference area. If the movement target position is located within the interference area, the interference checking section 21 judges that there is a possibility of the interference.

If the possibility of the interference between the tool T and the first or second spindle portion 102, 103 is confirmed, the interference checking section 21 outputs a drive stopping signal (interference confirming signal) to the drive controlling section 64, and outputs an alarm display signal (interference confirming signal) to the alarm section 54.

Thereafter, the aforesaid process sequence is performed at predetermined sampling intervals and, upon reception of an interference checking end signal from the program analyzing section 62 or the input/output device 22, the interference checking section 21 ends the process (Step S28).

As detailed above, where there are plural interfering relationships (e.g., the interfering relationships between the tool T and the first spindle portion 102 and between the tool T and the second spindle portion 103), the interference checking section 21 of the interference preventing apparatus 20 according to this embodiment receives the presetter mount signal from the presetting section 31, and does not perform the interference checking operation for an interfering relationship on the side of the presetter 32 when the NC machine tool is in the manual operation.

When the tool offset amount of the tool T to be used for the machining on the side of the first spindle portion 102 is calculated, for example, the interference checking operation is not performed for the interfering relationship between the tool T and the first spindle portion 102 for more easily performing the tool offset amount calculating operation, as described above. Where the interfering relationship to be subjected to the interference checking operation is selected by the external input as in the first embodiment, an operator's input mistake cannot perfectly be eliminated. Therefore, there is a possibility that the interference checking operation is not performed for the intended interfering relationship due to the input mistake.

In the interference preventing apparatus 20 according to this embodiment, the interference checking operation for an interfering relationship on the side of the presetter 32 is automatically cancelled on the basis of the preseter mount signal but not on the basis of the manually inputted signal. Therefore, an inconvenience resulting from a human mistake as described above can be prevented, whereby the tool offset amount calculating operation can safely be performed.

While the present invention has thus been described by way of the embodiments thereof, the present invention is not limited to these embodiments, but may be embodied in any other conceivable ways.

Figure 6:
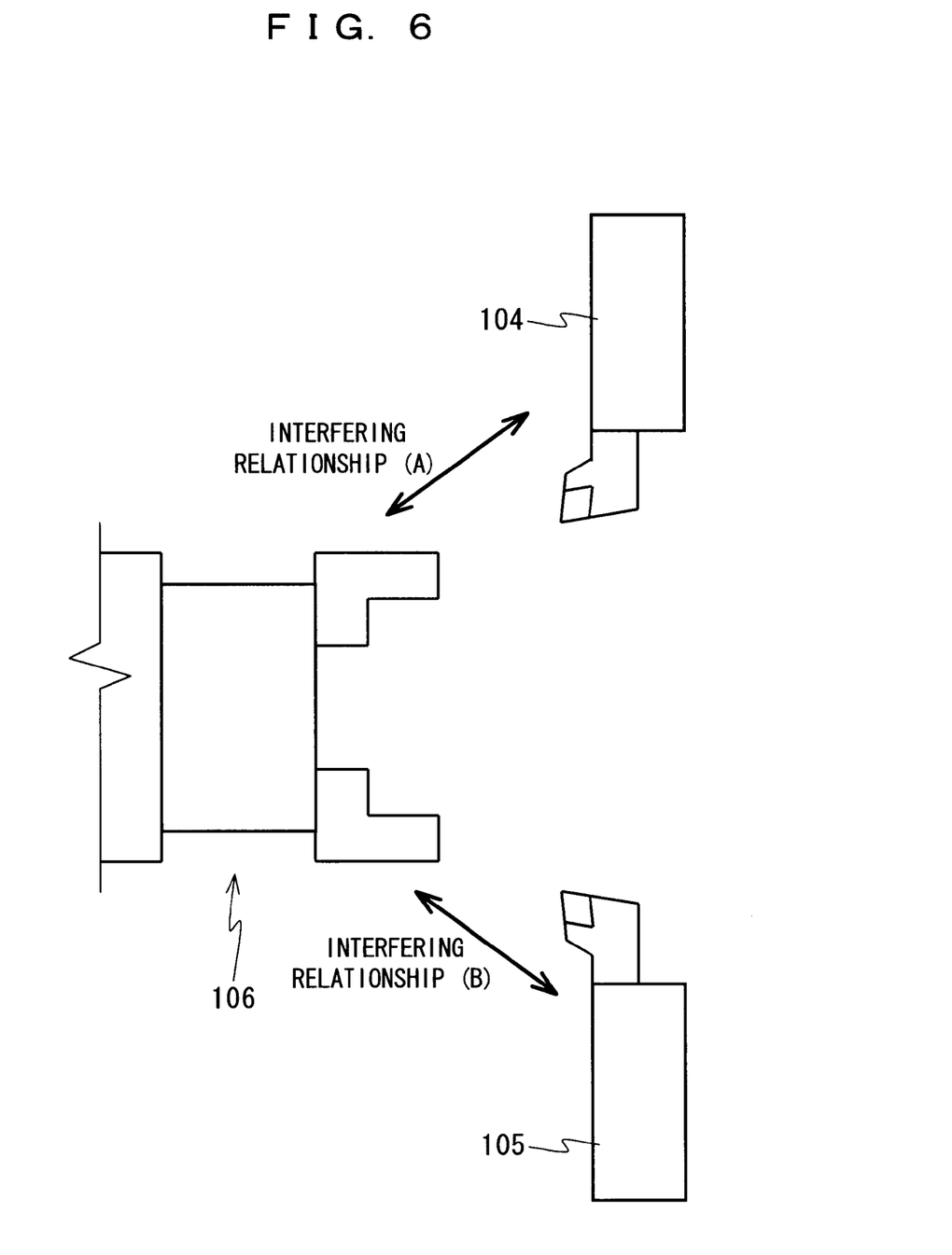
FIG. 6 is a diagram for explaining interfering relationships between a movable member and structural members according to further another embodiment.
Figure 7:
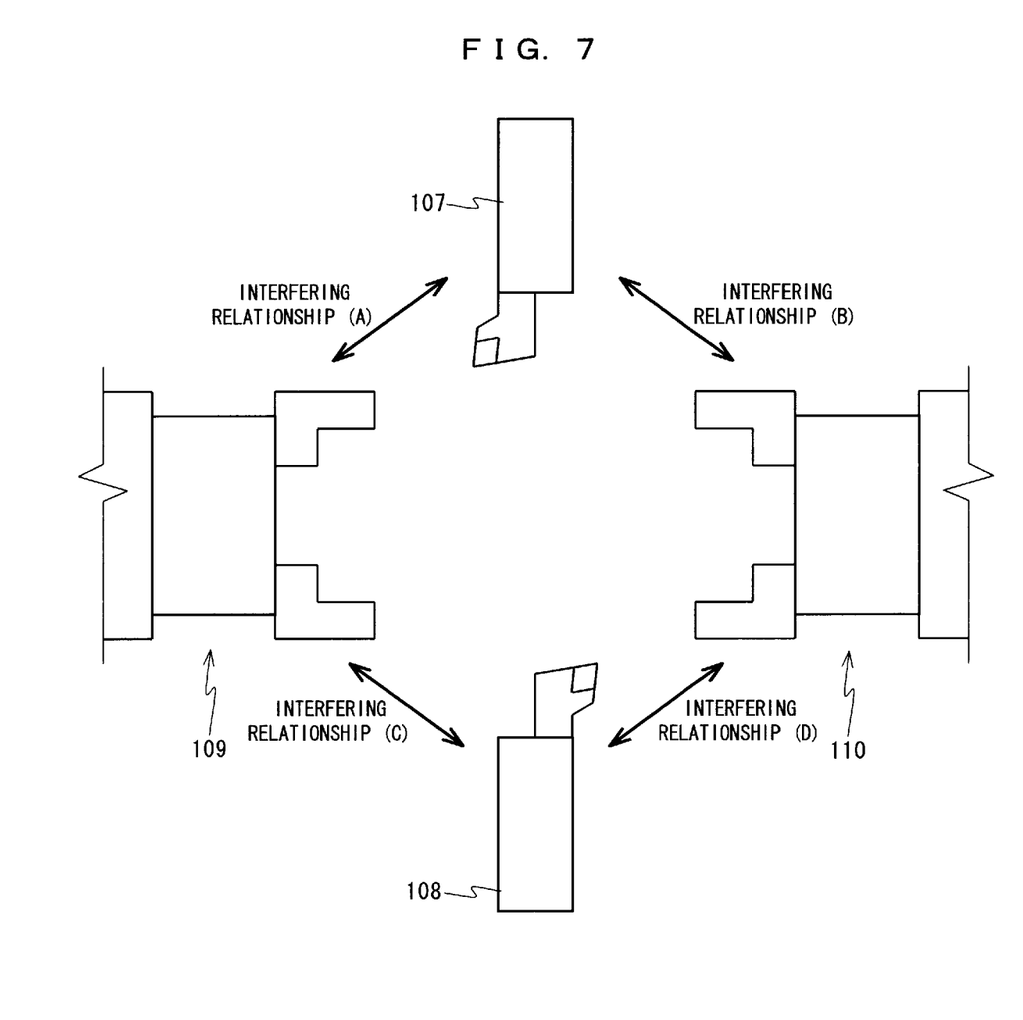
FIG. 7 is a diagram for explaining interfering relationships between movable members and structural members according to still another embodiment.

For example, the interfering relationships are not limited to those shown in FIG. 3, but the present invention is applicable to any other interfering relationships such as shown in FIGS. 6 and 7. In an NC machine tool including one spindle portion 106 and two tool posts (first and second tool posts 104, 105), there are interfering relationships (A) and (B) between the spindle portion 106 and the first tool post 104 and between the spindle portion 106 and the second tool post 105 as shown in FIG. 6. In an NC machine tool including two spindle portions (first and second spindle portions 109, 110) and two tool posts (first and second tool posts 107, 108), there are interfering relationships (A), (B), (C) and (D) between the first spindle portion 109 and the first tool post 107, between the first spindle portion 109 and the second tool post 108, between the second spindle portion 110 and the first tool post 107 and between the second spindle portion 110 and the second tool post 108 as shown in FIG. 7.

The NC machine tool to be employed in the present invention is not limited to the NC lathe, but the present invention is applicable to other machine tools such as machining centers.

What is claimed is:

1. In an NC machine tool comprising at least one movable member, a numerical controller for controlling an operation of the movable member, and at least one structural member which is likely to interfere with the movable member, the at least one movable member and the at least one structural member having plural interfering relationships with respect to each other, an interference preventing apparatus for preventing interference between the movable member and the structural member, comprising:

an interference area defining section for defining an interference area where the movable member is likely to interfere with the structural member within a area where the movable member is movable;

an interference area data storage section for storing therein data indicative of the interference area defined by the interference area defining section; and an interference checking section which performs an interference checking operation to check for a possibility of the interference between the movable member and the structural member in any of the plural interfering relationships on the basis of the interference area data stored in the interference area data storage section and data indicative of a target movement position of the movable member controlled by the numerical controller and, if the possibility of the interference is confirmed, outputs an interference confirming signal to the numerical controller;

wherein the interference checking section receives a selection signal externally inputted to select at least one of the plural interfering relationships between the at least one movable member and the at least one structural member, and performs the interference checking operation only for the selected interfering relationship.

2. An interference preventing apparatus as set forth in claim 1, wherein the interference checking section alternatively receives a specific operation signal from the numerical controller when the NC machine tool is in a manual operation and, upon reception of the operation signal, is prohibited from performing the interference checking operation for an interfering relationship associated with the received operation signal.

3. An interference preventing apparatus as set forth in claim 2, wherein the specific operation signal is a preseter mount signal which is outputted when a tool preseter is mounted in the NC machine tool.

* * * * *